United States Patent [19]

McGrail et al.

[11] Patent Number: 5,605,984

[45] Date of Patent: Feb. 25, 1997

[54] POLYMERIC COMPOSITIONS AND COMPONENTS THEREOF

[75] Inventors: Patrick T. McGrail, Mickleby; Jeffrey T. Carter, Redcar, both of England

[73] Assignees: Imperial Chemical Industries PLC, United Kingdom; ICI Composites Inc., Ariz.

[21] Appl. No.: 585,940

[22] Filed: Sep. 21, 1990

[30] Foreign Application Priority Data

Sep. 29, 1989 [GB] United Kingdom ............... 8921999
Mar. 22, 1990 [GB] United Kingdom ............... 9006435

[51] Int. Cl.[6] .................... C08L 61/06; C08L 61/10; C08L 81/06
[52] U.S. Cl. .................. 525/481; 525/485; 525/505; 525/507; 525/536; 525/537
[58] Field of Search ................. 525/481, 485, 525/505, 507, 536, 537

[56] References Cited

U.S. PATENT DOCUMENTS 4,972,031  11/1990  Choate et al. .

FOREIGN PATENT DOCUMENTS 0311349  10/1988  European Pat. Off. .
434676   1/1976   Germany .
C-286    6/1985   Japan .

Primary Examiner—W. Robinson H. Clark

[57] ABSTRACT

Polymer compositions comprising phenol/formaldehyde systems and polyarylsulphones having epoxy pendent or end groups are disclosed together with novel epoxy-ended polyarylsulphones and novel cross-linked epoxy-ended polyarylsulphones. The compositions can be both unreinforced and reinforced with fibres and/or other fillers.

14 Claims, No Drawings

POLYMERIC COMPOSITIONS AND COMPONENTS THEREOF

This invention relates to thermosettable and thermoset compositions derived from aromatic polymers having reactive groups and to processes for making such polymers.

U.S. Pat. No. 4,448,948 discloses polyethersulphones and polyetherketones of relatively low molecular weight which are terminated by glycidyloxy end groups and a method of making such polymers. The polymers are described as being cross-linkable using a conventional epoxy cross-linking reagent such as diaminodiphenyl sulphone.

EP-A-311349 discloses inter alia polymer compositions which have a polyarylsulphone component and a thermoset resin component. The thermo-setting component can be selected from a epoxy resin, a bismaleimide resin or a phenol-formaldehyde resin and preferred polyarylsulphone polymers are of specified formula and preferably have reactive end groups, —OH and —$NH_2$ end groups particularly being exemplified.

In accordance with the invention, polymer compositions comprising a phenol/formaldehyde (PF) thermosetting system and a polyarylsulphone comprising reactive epoxy groups exhibit exceptional and surprising increases in certain physical properties, especially when containing reinforcing fillers such as glass or carbon fibres.

Suitable PF systems include both Novolac and resoles types of PF.

The epoxy groups may be attached to the polymer chain either as end-groups or as pendent-groups or both.

When the epoxy groups are end-groups, the number of such end groups per polymer chain is preferably in the range 1.5 to 2.5 and very suitably is 1 ±0.2 at each end of each chain on average in a given sample of polymer.

In preferred polymers for use in compositions according to the invention, the polymer chains are comprised by units E and $E^1$ connected by ether and/or thioether linkages, E being a divalent aromatic radical containing a sulphone group and $E^1$ being a divalent aromatic radical optionally containing a sulphone group and the end-groups are of formula I:-

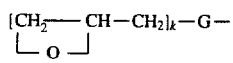   I where k is an integer from 1 to 3 selected in dependence upon G; and G is a direct link or is of formula II:

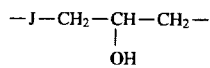   II where

J is a residue selected from at least one of the following:- dihydric phenol residue, an aminophenol residue or an aromatic diamine residue, said residues preferably being of formula III:-

   III where

Ph is phenylene, especially 1,4-phenylene; and

A is a direct link, —O—, —S—, —SO—, —$SO_2$—, —CO—, —$CO_2$—or a $C_1$ to $C_6$ hydrocarbon.

In preferred polymer compositions according to the invention, the polysulphone units E and $E^1$ are independently selected from radicals of formula IV:-

   IV where

Ph is phenylene, especially 1,4-phenylene, and optionally carrying up to four non-interfering substituents such as halogen, alkyl or alkoxy; and n=1 to 2 and can be fractional; and optionally, in a minor proportion, from radicals of formula V:-

$(Ph)_a$   V where a is 1 to 3 and can be fractional, and such phenylenes are linked linearly through a single chemical bond or a divalent group other than $SO_2$ or are fused together.

By "fractional" reference is made to the average value for a given polymer chain containing units having various values of n or a.

In a preferred polymer composition according to the invention, the relative proportions of the repeating units of the polyarylsulphone is such that on average at least two units $(PhSO_2Ph)_n$ are in immediate mutual succession in each polymer chain present and is preferably in the range 1:99 to 99:1, especially 10:90 to 90:10, respectively. Typically, the ratio is in the range 25–50 $(Ph)_a$, balance (Ph $SO_2$ Ph)$_n$.

In preferred polyarylsulphones for use in polymer compositions according to the invention, the units are of formula VI:-

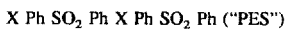   VI alone or together with units of formula VII:-

   VII where X is O or S and may differ from unit to unit; and the ratio of VI to VII is preferably between 10:90 and 80:20 especially between 10:90 and 55:45.

The preferred relative proportions of the repeating units of the polyarylsulphone may be expressed in terms of the weight percent $SO_2$ content, defined as 100 times (weight of $SO_2$)/(weight of average repeat unit). The preferred $SO_2$ content is at least 22%, preferably 23% to 30%. When a=1, this corresponds to PES/PEES ratios of at least 20:80, preferably in the range 35:65 to 65:35.

The above proportions refer only to the units mentioned. In addition to such units the polyarylsulphone may contain up to 50% especially up to 25% molar of other repeating units; the preferred $SO_2$ content ranges (if used) then apply to the whole polymer. Such units may be for example of the formula:-

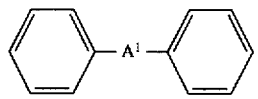   IX in which $A^1$ is a direct link, O, S, CO or a divalent hydrocarbon radical. When the polyarylsulphone is the product of nucleophilic synthesis, its units may have been derived for example from one or more the following bisphenols and/or corresponding bisthiols or phenol-thiols:- hydroquinone 4,4'-dihydroxybiphenyl resorcinol dihydroxynaphthalene (2,6 and other isomers)

4,4'-dihydroxydiphenylether or thioether 4,4'-dihydroxybenzophenone 2,2'-bis(4-hydroxyphenyl)propane or methane.

If a bisthiol is used, it may be formed in situ, that is a dihalide as described for example below may be reacted with an alkali sulphide or polysulphide or thiosulphate.

Other examples of such additional units are of the formula:-

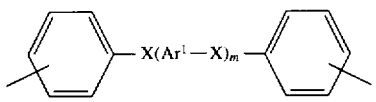   X where

X is independently CO or $SO_2$;

$Ar^1$ is a divalent aromatic radical; and m is an integer from 0 to 3, provided that m is not zero where X is $SO_2$.

$Ar^1$ is preferably at least one divalent aromatic radical selected from phenylene, biphenylene or terphenylene. Particular units have the formula:-

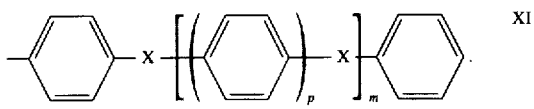   XI where m>0. When the polymer is the product of nucleophilic synthesis, such units may have been derived from one or more dihalides, for example:-

4,4'-dihalobenzophenone 4,4'-bis(4-chlorophenylsulphonyl)biphenyl 1,4 bis(4-halobenzoyl)benzene 4,4'-bis(4-halobenzoyl)biphenyl They may of course have been derived partly from the corresponding bisphenols.

The polyarylsulphone may be the product of nucleophilic synthesis from halophenols and/or halothiophenols. In any nucleophilic synthesis, the halogen, if chlorine or bromine, may be activated by the presence of a copper catalyst. Such activation is often unnecessary if the halogen is activated by an electron withdrawing group. In any event fluoride is usually more active than chloride. Any nucleophilic synthesis of the polyarylsulphone is carried out, preferably in presence of one or more alkali metal carbonates in up to 10% molar excess over the stoichiometric and of an aromatic sulphone solvent, at a temperature in the range 150°–350° C.

If desired, the polyarylsulphone may be the product of electrophilic synthesis.

The polyarylsulphone before epoxidation preferably contains end groups and/or pendant groups of formula —$R^1$-Z where $R^1$ is a divalent hydrocarbon group, preferably aromatic, and Z is a residue of a group having an active hydrogen reactive with an appropriate epoxy-containing compound which will form an epoxy group as hereinbefore defined, Z especially being the residue of —OH, —$NH_2$, —$NHR^2$ or —SH, where $R^2$ is a hydrocarbon group containing up to 8 carbon atoms.

The number average molecular weight of the polyarylsulphone is suitably in the range 2000 to 60000. Preferably it is over 9000 especially over 10000 for example 11000 to 25000. However, if desired, polymers having a lower molecular weight, eg 3000 to 9000, may be utilised in some applications, for example to control the final molecular weight of extended polymers described in more detail below.

It is convenient to use reduced viscosity (RV), measured on a solution of 1 g of polymer in 100 ml of solution in dimethyl formamide at 25° C. as an indication of molecular weight, the correlation being as follows:-

| RV | 0.15 | 0.25 | 0.45 | 0.92 |
|---|---|---|---|---|
| MW (number average) | 5000 | 13000 | 20000 | 60000 |

(Such molecular weights were in fact measured by vapour phase osmometry and are of course subject to the usual error range of about 10%).

The epoxy groups on the polyarylsulphones according to the invention can typically be derived from epoxide-containing compounds which are the mono or poly-glycidyl derivative of one or more of:- aromatic diamines aromatic monoprimary amines aminophenols polyhydric phenols polyhydric alcohols polycarboxylic acids.

Examples are the following, which are liquids at ambient temperature:- tetraglycidyl diamino diphenylmethane eg "MY 720" or "MY 721" sold by Ciba-Geigy, viscosity 10–20 Pa s at 50° C.; (MY 721 is a lower viscosity version of MY720 and is designed for higher use temperatures);

triglycidyl derivative of p-aminophenol (eg "MY 0510" sold by CibaGeigy), viscosity 0.55–0.85 Pa s at 25° C.; or diglycidyl ether of 2,2-bis(4,4'-dihydroxy phenyl) propane (eg "Epikote 828" sold by Shell), preferably of viscosity 8–20 25 Pa at 25° C.

The invention also includes a polyarylsulphone as hereinbefore described and which has epoxy end-groups, said epoxy end-groups being of formula IIA:-

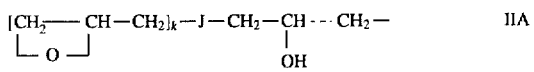   IIA where k is an integer from 1 to 3 selected in dependence upon J; and J is a residue selected from at least one of the following:-
a dihydric phenol residue, an aminophenol residue or an aromatic diamine residue, said residues preferably being of formula III:-

-PhAPh-   III where

Ph is phenylene, especially 1,4-phenylene; and

A is a direct link, —O—, —S—, —SO—, —$SO_2$—, —CO—, —$CO_2$—or a $C_1$ to $C_6$ hydrocarbon.

The polyarylsulphones containing epoxy group can be made by reacting at least one starting polymer of units E and $E^1$ connected by ether and/or thioether linkages which has at least one pendent or terminal group of formula —$R^1$ZH, as hereinbefore defined, with:-

(a) when G is to be a direct link, at least one epihalohydrin; and (b) when G is to be of formula II, at least one compound of formula

IIB:-

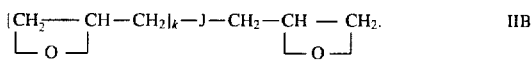

According to the invention also, an aromatic polymer comprises a polyarylsulphone chain having units E and E¹ connected by ether and/or thioether linkages and which has at least one pendent or terminal group of formula —R¹Z— and a second polyarylsulphone chain having units E and E¹ connected by ether and/or thioether linkages and which has at least one pendent or terminal group of formula —R¹Z—, said chains being connected by said groups of formula —R¹Z- which are linked by a residue of an epoxy group of formula I:-

The invention also provides a process for making a polymer according to the preceding paragraph, in which process a polyarylsulphone chain having units E and E¹ connected by ether and/or thioether linkages and which has at least one pendent or terminal group of formula —R¹Z— to which is connected an epoxy group of formula I is reacted with a second polyarylsulphone chain having units E and E¹ connected by ether and/or thioether linkages and which has at least one pendent or terminal group of formula —R¹ZH.

The starting molecular weights and the relative proportions of the two polyarylsulphones are chosen according to the final molecular weight required.

Preferably, the ratio of groups of formula —R¹Z— to which is connected an epoxy group of formula I to groups of formula —R¹ZH is in the range 10:90 to 90:10, more preferably in the range 20:80 to 80:20 and, more especially in the range 70:30 to 60:40.

Such polymers exhibit surprising and significantly improved properties relative to polymers having end groups of formula —K¹ZH, especially when containing reinforcing fillers such as glass or carbon fibres.

The polyarylsulphones having epoxy groups in accordance with the invention can usefully be cross-linked similarly to conventional thermoset epoxy resin systems.

The cross-linked polyarylsulphones are suitably the product of at least partly curing a polyarylsulphone having epoxy groups with a curing agent and possibly also a catalyst.

The curing agent is preferably an amino compound having a molecular weight up to 500 per amino group, for example an aromatic amine or a guanidine derivative. Particular examples are 3,3'- and 4,4'-diaminodiphenylsulphone, methylenedianiline and dicyandiamide. The total amine content of the curing agent is in the range 70–110% of the stoichiometric requirement of the polyarylsulphone. Other standard epoxy curing agents such as aliphatic diamines, amides, carboxylic acid anhydrides, carboxylic acids, phenols or a phenol/formaldehyde condensate can be used if desired.

If a catalyst is used, it is typically a Lewis acid, for example boron trifluoride, conveniently as a derivative with an amine such as piperidine or methyl ethylamine. Alternatively it can be basic, for example an imidazole or amine.

The polymer compositions of the invention are particularly suitable for the fabrication of structures, including load-bearing or impact resisting structures. For this purpose it may contain a reinforcing agent such as fibres.

In composites according to the invention, the fibres can be added short or chopped typically of mean fibre length not more than 20 mm, for example about 3–6 mm, typically at a concentration of 5% to 70%, more especially 20% to 60%, by weight. However, for structural applications, it is preferred to use continuous fibre for example glass or carbon, especially at 30% to 70%, more especially 50% to 70%, by volume.

The fibre can be organic, especially of stiff polymers such as poly paraphenylene terephthalamide, or inorganic. Among inorganic fibres glass fibres such as "E" or "S" can be used, or alumina, zirconia, silicon carbide, other compound ceramics or metals. A very suitable reinforcing fibre is carbon, especially as graphite. Organic or carbon fibre is preferably unsized or is sized with a material that is compatible with the composition according to the invention, in the sense of being soluble in the liquid precursor composition without adverse reaction or of bonding both to the fibre and to the thermoset/thermoplast composition according to the invention. In particular carbon or graphite fibres that are unsized or are sized with epoxy resin precursor or thermoplast such as polyarylsulphone are preferred. Inorganic fibre preferably is sized with a material that bonds both to the fibre and to the polymer composition: examples are the organo-silane coupling agents applied to glass fibre.

The composition may contain for example conventional toughening agents such as liquid rubbers having reactive groups, aggregates such as glass beads, rubber particles and rubber-coated glass beads, fillers such as polytetrafluoroethylene, graphite, boron nitride, mica, talc and vermiculite, pigments, nucleating agents, and stabilisers such as phosphates. The total of such materials and any fibrous reinforcing agent should be such that the composition contains at least 20% by volume of the polymer composition. The percentages of fibres and such other materials are calculated on the total composition once the composition is in its final usable state, eg cured or cross-linked.

For composites according to the invention, short fibres may be added to a solution of the polyarylsulphone according to the invention or to polymer compositions containing said polyarylsulphone prior to evaporation of the solvent. However, preferred composites comprise continuous fibres, the composites being made by passing essentially continuous fibre into contact the solution of the polyarylsulphone and, when present, other ingredients. The resulting impregnated fibrous reinforcing agent may be used alone or together with other materials, for example a further quantity of the same or a different polymer or resin precursor or mixture, to form a shaped article.

A further procedure comprises forming incompletely cured composition into film by for example compression moulding, extrusion, melt-casting or belt-casting, laminating such films to fibrous reinforcing agent in the form of for example a non-woven mat of relatively short fibres, a woven cloth or essentially continuous fibre in conditions of temperature and pressure sufficient to cause the mixture to flow and impregnate the fibres and curing the resulting laminate.

Composites according to the invention can be comprised by plies of impregnated fibrous reinforcing agent laminated together by heat and pressure, for example by compression moulding or by heated rollers, at a temperature above the curing temperature of the thermoset component or, if cure has already taken place, above the glass transition temperature of the mixture, conveniently at least 150° C. and typically about 190° C., and at a pressure in particular at least 0.1 MN/m², preferably at least 5 MN/m², followed by a free-standing post cure period, typically at about 240° C.

The resulting multi-ply laminate may be anisotropic in which the fibres are oriented essentially parallel to one another or quasiisotropic in each ply of which the fibres are oriented at an angle, conveniently 45° as in most quasiisotropic laminates but possibly for example 30° or 60° or 90° or intermediately, to those in the plies above and below. Orientations intermediate between anisotropic and quasiisotropic, and combination laminates, may be used. Suitable laminates contain at least four, preferably at least eight, plies. The number of plies is dependent on the application for the laminate, for example the strength required, and laminates containing thirty-two or even more, for example several hundred, plies may be desirable. There may be aggregates, as mentioned above, in interlaminar regions.

The invention will now be illustrated by reference to the following Examples.

In the Examples, the properties of flexural modulus, compressive yield stress (yield strength) and resin fracture strength and toughness, $K_{1c}$ and $G_{1c}$, were determined as follows.

Flexural modulus was measured using a three point bend uniform specimen on an "Instron" model 1122 testing machine, at a cross-head speed of 5 mm/min, and is determined in accordance with the following formula:

$$E = \tfrac{1}{4} \cdot F/ \cdot L^3 BW^3$$

where

F is the force required to cause central deflection of the specimen;

F/was evaluated at small deflection; is less than W/$_2$;

W is the thickness of the specimen;

B is the breadth of the specimen; and

L is the separation of the supports.

Typically, L=50 mm, B=3 mm and W=10 mm.

The compressive yield stress, $\sigma_y$, was measured on the "Instron" machine with a cross-head speed of 5 mm/min using samples of various dimensions.

To characterise fracture strength and toughness, a three point bend, single edge-notched, linear elastic fracture mechanics test was used, the data being generated using an impact instrument. The fracture toughness, the critical value of the strain energy release rate in crack opening mode, is given by:-

$$G_{1c} = u_c / BW \cdot \Phi$$

where $\Phi$ is a function of geometry and $U_c$ is the energy absorbed in the impact test. The specimens were tested at −65° C. using a machined notch and a test speed of 1ms$^{-1}$.

EXAMPLE 1

A sample of 40:60 PES:PEES polyarylsulphone was made by reacting 4,4'-dichlorodiphenylsulphone (50 molar parts) with hydroquinone (30 molar parts) and dihydroxydiphenylsulphone (20 molar parts) in the presence of potassium carbonate (50 molar parts) and in diphenylsulphone solvent at a temperature rising to 280° C. A slight excess 4,4'-dichlorodiphenylsulphone was used resulting in —Cl end groups on the polymer. During the reaction, m-aminophenol was added to the reaction mixture as an endcapping agent. Following cooling, the polymer sample was ground, washed with acetone, methanol and water until essentially free from potassium salts and dried.

The polymer, Sample A, had an RV of 0.28 (1% solution in dimethylformamide—DMF), a Tg of 195° C. and a structure as follows:-

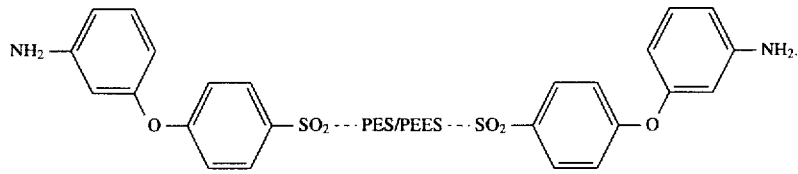

A part of Sample A was mixed with diglycidyl ether of 2,2-bis (4,4'-dihydroxy phenyl)propane ("Epikote 828" sold by Shell) (2 molar parts). The mixture was warmed until the polymer dissolved, heated at 180° C. for 2 hours. After cooling, the reactants were dissolved in dichloroethane (virtually colourless in solution) and then poured into methanol to precipitate the polymer. Examination of the polymer (hereinafter Sample B) by infra red (IR) and nuclear magnetic resonance (nmr) techniques showed the polymer to be of formula:-

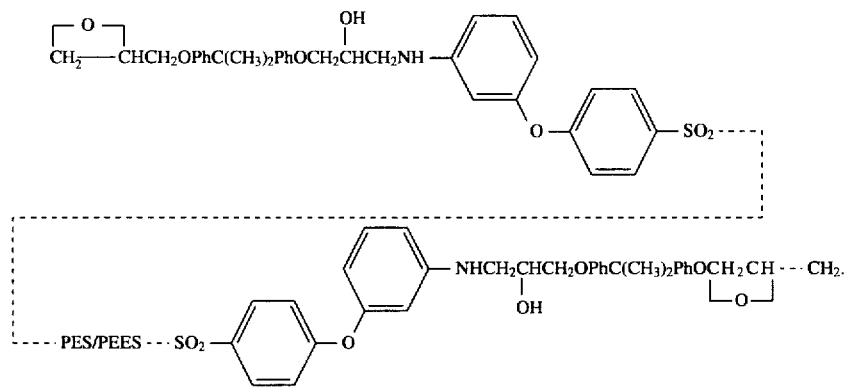

EXAMPLE 2

A 50:50 mixture of Sample A and Sample B, both in powder form, was compression-moulded at 300° C., 4 tonnes pressure for 15 minutes to give a film of 2 mm thickness. The resultant film was very tough and stiff particularly when compared to a similar film moulded from Sample A (which is brittle at these molecular weights). In dichloromethane at ambient temperatures, a portion of the film exhibited only slight swelling after 7 days (polyarylsulphones are usually soluble or swell extensively in dichloromethane). The film was also thermoplastic in that it is meltable.

Sample B, when moulded at 300° C., did not appear to homopolymerise.

EXAMPLE 3

At room temperature, samples of PF precondensate (Novolak SFP 118 ex Schenectady Chemicals Inc) (68g) and hexamethylenetetramine (1 g) were mixed in 90:10 v/v methylene chloride:methanol with various amounts of the polymers of Samples A and B. A control sample not containing any polymer was also prepared. The mixtures were poured into trays lined with mould release paper and the solvent allowed to evaporate. The residual solvent was then removed in a vacuum oven at 60° C./0 mm Hg.

The resultant materials were then ground into powder and moulded into test plaques as follows. The press and the matched metal mould used for forming the plaques was heated to 150° C. g for 1 hour. Vacuum bags were prepared using a nylon bagging film stable up to 260° C. Three sides of the bags were sealed using mastic tape. The pre-heated mould parts with the powdered moulding compound therebetween were placed in the bag which was then sealed and evacuated. The bag containing the mould was then placed in the press and increasing pressure was applied until "flashings" appeared to decrease with increasing pressure at which point maximum moulding pressure (eg 15 tonnes for a 150 mm×100 mould) was applied. The mould was held under vacuum at 150° C. for 15 minutes and then was removed from the press and allowed to cool to 50° C. before de-moulding the plaque.

The mechanical properties of two of the samples are given in Table 1. The ductility factors (DF) of all of the samples are shown in Table 2.

It is evident that polymer compositions consisting of PF and polyarylsulphones according to the invention have greatly increased toughness as shown by the ductility factor results.

Examination of the morphologies of the moulded samples revealed that the morphologies appeared to change from homogeneous to ribbon-like and then co-continuous as the level of polyarylsulphone increased, the co-continuous morphologies being present at above about 20% by weight of polyarsulphone.

EXAMPLE 4

Further compositions were prepared according to the method of Example 3 using various amounts of polymers of Samples A and B and including chopped glass fibre (3.2 mm long, aminosilane sized, ex Certaineed, USA) and the resultant plaques were tested for fracture strength and yield strength to enable the ductility factors (DF) to be determined for the samples. Two of the compositions (25% polymer, 40% glass) are set out in Table 3 (proportions by weight) together with the results relating thereto, the full set of samples and their ductility factors being listed in Table 4, the figures in brackets after "DF" being the weight % of glass fibre in the composition.

EXAMPLE 5

Prepreg was fabricated by pumping 25–35% by weight solutions of polymer onto a spread 12K tow of Hercules IM7 carbon fibre as it was wound onto a drum, the prepreg being cut off the drum and laid flat to dry at room temperature. The resultant composite plaques consisted of 24 unidirectional layers of prepreg which were moulded at 320° C. and 2.4 MPa pressure for 5 minutes following a 15 minute preheat period during which no pressure was applied. The test plaques were used to determine fracture toughness ($G_{1c}$). The samples and results are summarised in Table 5.

TABLE 1

| SAMPLE | 5 | 9 | 1 |
|---|---|---|---|
| Flexural Modulus GPa | 5.15 | 5.00 | 6 |
| Yield Strength $\sigma_y$ MPa | 226 | 241 | 343 |
| Fracture Strength $K_{1c}$ MNm$^{-1.5}$ | 0.63 | 1.9 | 0.52 |
| Fracture Toughness $G_{1c}$ KJm$^{-2}$ | 0.17 | 0.88 | 0.07 |
| Ductility Factor $(K_{1c}/\sigma_y)^2$ µm | 7.8 | 62 | 2.2 |

TABLE 2

| SAMPLE | % OF A | DF | SAMPLE | % OF B | DF |
|---|---|---|---|---|---|
| 1 | 0 | 2.2 | 1 | 0 | 2.2 |
| 2 | 10 | 3.3 | 5 | 10 | 10 |
| 3 | 15 | 12 | 6 | 15 | 14 |
| 4 | 20 | 13 | 7 | 20 | 23 |
| — | — | — | 8 | 30 | 55 |
| 5 | 35 | 7.8 | 9 | 35 | 62 |
| — | — | — | 10 | 40 | 102 |

TABLE 3

| Chopped glass fibre | 40 | 32.18 | 32.2 |
|---|---|---|---|
| % of glass | 40 | 40 | 40 |
| SFP 118 | 38.13 | 30.4 | 40.5 |
| Hexamethyleneteteramine | 6.73 | 5.36 | 7.16 |
| Sample A | 15.14 | — | — |
| Sample B | — | 12.06 | — |
| % of polymer | 25 | 25 | — |
| Flexural Modulus GPa | 13.8 | 12.6 | 12.6 |
| Yield Strength $\sigma_y$ MPa | 441 | 450 | 473 |
| Fracture Strength $K_{1c}$ MNm$^{-1.5}$ | 5.63 | 8.45 | 4.23 |
| Fracture Toughness $G_{1c}$ KJm$^{-2}$ | 4.48 | 8.18 | 2.95 |
| Ductility Factor $(K_{1c}/\sigma_y)^2$ µm | 163 | 353 | 80 |

TABLE 4

| % OF A | DF (20) | DF(40) | DF(60) | % OF B | DF(20) | DF(40) | DF(60) |
|---|---|---|---|---|---|---|---|
| 0 | 55 | 80 | 95 | 0 | 55 | 80 | 95 |
| 15 | 49 | 182 | 99 | 15 | 175 | 285 | 293 |
| 25 | 138 | 151 | 97 | 25 | 178 | 353 | 725 |
| 35 | 200 | 210 | 144 | 35 | 190 | 321 | 665 |

TABLE 5

| POLYMER | FIBRE VOLUME FRACTION (%) | $G_{1c}$ (Average of 2) (KJm$^{-2}$) |
| --- | --- | --- |
| 100% A1[1,3] | 65.2 | 1.09 |
| 100% A[1] | 57.9 | 1.37 |
| 100% A[2] | 57.3 | 0.86 |
| 67% A/33% B[2] | 60.3 | 2.30 |
| 50% A/50% B[1] | 60.6 | 1.64 |
| 50% A/50% B[2] | 63.1 | 1.95 |
| 50% A/50% B[2] | 62.8 | 1.91 |
| 33% A/67% B[2] | 54.8 | 2.87 |
| 20% A/80% B[2] | 57.3 | 2.65 |

[1] solvent used was 90/10 v/v $CH_2Cl_2/CH_3OH$.
[2] solvent used was 67/33 v/v cyclopentanone/acetone.
[3] polymer A1 was made in the same way as polymer A but it had an RV of approximately 0.22.

We claim:

1. A curable polymer composition comprising a phenol/formaldehyde thermosetting system and a polyarylsulphone comprising reactive epoxy groups.

2. A polymer composition according to claim 1 wherein, when the epoxy groups are end groups, the number of such end groups per polymer chain is in the range 1.5 to 2.5.

3. A polymer composition according to claim 1 wherein the polymer chains are comprised by units E and $E^1$ connected by ether and/or thioether linkages, E being a divalent aromatic radical containing a sulphone group and $E^1$ being a divalent aromatic radical optionally containing a sulphone group and the end-groups are of formula I:-

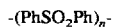    I where k is an integer from 1 to 3 selected in dependence upon G; and G is a direct link or is of formula II:-

$$-J-CH_2-CH(OH)-CH_2-$$    II where J is a residue selected from the group consisting of:-
dihydric phenol residue, an aminophenol residue or an aromatic diamine residue; and
A is a direct link, —O—, —S—, —SO—, —SO$_2$—, —CO—, —CO$_2$— or a $C_1$ to $C_6$ hydrocarbon.

4. A polymer composition according to claim 3 wherein the units E and E' are radicals of formula IV:-

-(PhSO$_2$Ph)$_n$-    IV where
Ph is phenylene, and optionally carrying up to four non-interfering substituents such as halogen, alkyl or alkoxy; and
n=1 to 2 and can be fractional; and optionally, in a minor proportion, from radicals of formula V:-

(Ph)$_a$    V where
a is 1 to 3 and can be fractional, and such phenylenes are linked linearly through a single chemical bond or a divalent group other than SO$_2$ or are fused together.

5. A polymer composition according to claim 1 comprising a reinforcing filler.

6. A polymer composition according to claim 1 wherein, when the epoxy groups are end groups, the number of such end groups is 1±0.2 at each end of each chain on average in a given sample of polymer.

7. A polymer composition according to claim 3 wherein J is of formula III:-

-PhAPh-    III where Ph is phenylene.

8. A polymer composition according to claim 7 wherein Ph is 1,4-phenylene.

9. A polymer composition according to claim 4 wherein Ph is 1,4-phenylene.

10. A curable polymer composition comprising a phenol/formaldehyde thermosetting system, a polyarylsulphone comprising reactive epoxy groups and reinforcing fibres.

11. A polymer composition according to claim 10 wherein the reinforcing fibres are glass fibres.

12. A curable polymer composition comprising a phenol/formaldehyde thermosetting system, polyarylsulphone comprising reactive epoxy groups and reinforcing fibres, said polyarylsulphone comprising units E and $E^1$ connected by ether and/or thioether linkages, E being a divalent aromatic radical containing a sulphone group and $E^1$ being a divalent aromatic radical optionally containing a sulphone group, said reactive epoxy groups being of formula I:-

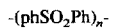    I where k is an integer from 1 to 3 selected in dependence upon G; and G is a direct link or is of formula II:-

$$-J-CH_2-CH(OH)-CH_2-$$    II where J is a residue selected from the group consisting of:-
a dihydric phenol residue, an aminophenol residue or an aromatic diamine residue; and
A is a direct link, —O—, —S—, —SO—, —SO$_2$—, —CO—, —CO$_2$— or a $C_1$ to $C_6$ hydrocarbon.

13. A polymer composition according to claim 12 wherein J is of formula III:-

-PhAPh-    III where Ph is phenylene.

14. A polymer composition according to claim 12 wherein the units E and E' are radicals of formula IV:-

-(phSO$_2$Ph)$_n$-    IV where
Ph is phenylene, and optionally carrying up to four non-interfering substituents such as halogen, alkyl or alkoxy; and
n=1 to 2 and can be fractional; and optionally, in a minor proportion, from radicals of formula V:

(Ph)$_a$    V where a is 1 to 3 and can be fractional, and such phenylenes are linked linearly through a single chemical bond or a divalent group other than SO$_2$ or are fused together.

* * * * *